United States Patent
Dooley

(10) Patent No.: US 8,942,013 B2
(45) Date of Patent: Jan. 27, 2015

(54) OVER VOLTAGE PROTECTION FOR ELECTRIC MACHINES

(71) Applicant: Pratt & Whitney Canada Corp., Longueuil (CA)

(72) Inventor: Kevin A. Dooley, Toronto (CA)

(73) Assignee: Pratt & Whitney Canada Corp., Longueuil, QC (CA)

( * ) Notice: Subject to any disclaimer, the term of this patent is extended or adjusted under 35 U.S.C. 154(b) by 170 days.

(21) Appl. No.: 13/773,140

(22) Filed: Feb. 21, 2013

(65) Prior Publication Data

US 2014/0233284 A1    Aug. 21, 2014

(51) Int. Cl.
  *H02H 7/125* (2006.01)
  *H02M 7/217* (2006.01)
  *H02H 3/20* (2006.01)
  *H02H 9/04* (2006.01)

(52) U.S. Cl.
  CPC .................................. *H02H 7/1252* (2013.01)
  USPC .............................. 363/53; 363/127; 361/91.1

(58) Field of Classification Search
  USPC .................................... 363/53, 127; 361/91.1
  See application file for complete search history.

(56) References Cited

U.S. PATENT DOCUMENTS

| | | | |
|---|---|---|---|
| 5,245,500 A * | 9/1993 | Rozman | 361/91.3 |
| 5,483,435 A * | 1/1996 | Uchino | 363/127 |
| 6,031,701 A * | 2/2000 | Maeckel et al. | 361/52 |
| 6,839,249 B2 | 1/2005 | Kalman et al. | |
| 7,116,083 B2 | 10/2006 | Kalman et al. | |
| 7,595,612 B2 | 9/2009 | Ganev et al. | |
| 7,869,234 B2 * | 1/2011 | Kazlauskas | 363/44 |
| 8,553,440 B1 * | 10/2013 | Nanut et al. | 363/129 |
| 2008/0067982 A1 * | 3/2008 | Dooley | 322/22 |
| 2010/0072959 A1 | 3/2010 | Dooley | |
| 2011/0227522 A1 | 9/2011 | Shinomoto et al. | |
| 2011/0254274 A1 | 10/2011 | Catucci et al. | |
| 2011/0320051 A1 * | 12/2011 | El-Antably et al. | 700/286 |
| 2012/0091974 A1 | 4/2012 | Chu | |

FOREIGN PATENT DOCUMENTS

WO    WO03043174    5/2003

* cited by examiner

*Primary Examiner* — Jue Zhang

(74) *Attorney, Agent, or Firm* — Norton Rose Fulbright Canada LLP

(57) ABSTRACT

A system and method for protecting an electrical power generation system from an over-voltage. The output voltage of a multi-phase rectifier, operatively connected between the output terminals of an electric machine and a load, is monitored. The input of the multi-phase rectifier is short-circuited upon detection that the output voltage has reached a threshold voltage. Removal of the short-circuiting of the input of the multi-phase rectifier is synchronized with a substantially zero-crossing of phase current flowing through switching devices in the rectifier once the output voltage is no longer above the threshold voltage.

16 Claims, 7 Drawing Sheets

OVER VOLTAGE PROTECTION FOR ELECTRIC MACHINES

TECHNICAL FIELD

The application relates generally to electric machines such as alternators and motors, and in particular to the protection of such machines from over voltage.

BACKGROUND OF THE ART

Electric machines, also known as electric motors and electric generators, are electro-mechanical energy converters. A permanent magnet machine is one such example, whereby permanent magnets in the rotor set up a magnetic field that causes a magnetomotive force. Over voltage conditions in an electric machine may cause damage to electrical loads powered by the electric machine. When the electric machine is part of an aircraft and the loads include circuitry for flight operations, it becomes critical to address potential over voltage conditions to prevent failure of the system.

Therefore, there is a need for an improved system and method for over voltage protection of electric machines.

SUMMARY

In one aspect, there is provided an electrical power generation system with over-voltage protection. The system comprises a multi-phase alternating current generating electric machine having output terminals and a multi-phase rectifier operatively connected between the output terminals of the electric machine and a load. The rectifier comprises a set of low side switching devices connected between the output terminal and a ground and a set of high side switching devices connected between the output terminals and a positive voltage source. The system also comprises a voltage sensing device operatively connected to an output of the rectifier for sensing an output voltage of the rectifier; at least one current sensing device operatively connected to the phases of the multi-phase alternating current generating electric machine; and a power control unit for generating a signal that switches the low side switching devices to an on state when the output voltage of the rectifier reaches a threshold voltage, and for generating independent signals that switch a corresponding one of the low side switching devices back to an off state when the alternating current flowing therethrough is substantially zero and the output voltage of the rectifier is no longer above the threshold voltage.

In another aspect, there is provided a method for protecting an electrical power generation system from an over-voltage comprising. The method comprises monitoring an output voltage of a multi-phase rectifier operatively connected between output terminals of an electric machine and a load; short-circuiting an input of the multi-phase rectifier upon detection that the output voltage has reached a threshold voltage; and synchronizing removal of the short-circuiting of the input of the multi-phase rectifier with a substantially zero-crossing of phase current flowing through switching devices in the rectifier once the output voltage is no longer above the threshold voltage.

In yet another aspect, there is provided an apparatus for protecting an electrical power generation system from an over-voltage. The apparatus comprises means for monitoring an output voltage of a multi-phase rectifier operatively connected between output terminals of an electric machine and a load; means for short-circuiting an input of the multi-phase rectifier upon detection that the output voltage has reached a threshold voltage; and means for synchronizing removal of the short-circuiting of the input of the multi-phase rectifier with a substantially zero-crossing of phase current flowing through switching devices in the rectifier once the output voltage is no longer above the threshold voltage.

DESCRIPTION OF THE DRAWINGS

Reference is now made to the accompanying figures in which:

FIG. 1 is a cross-section of an exemplary electric machine, namely a permanent magnet alternator;

DETAILED DESCRIPTION

Figure 1:
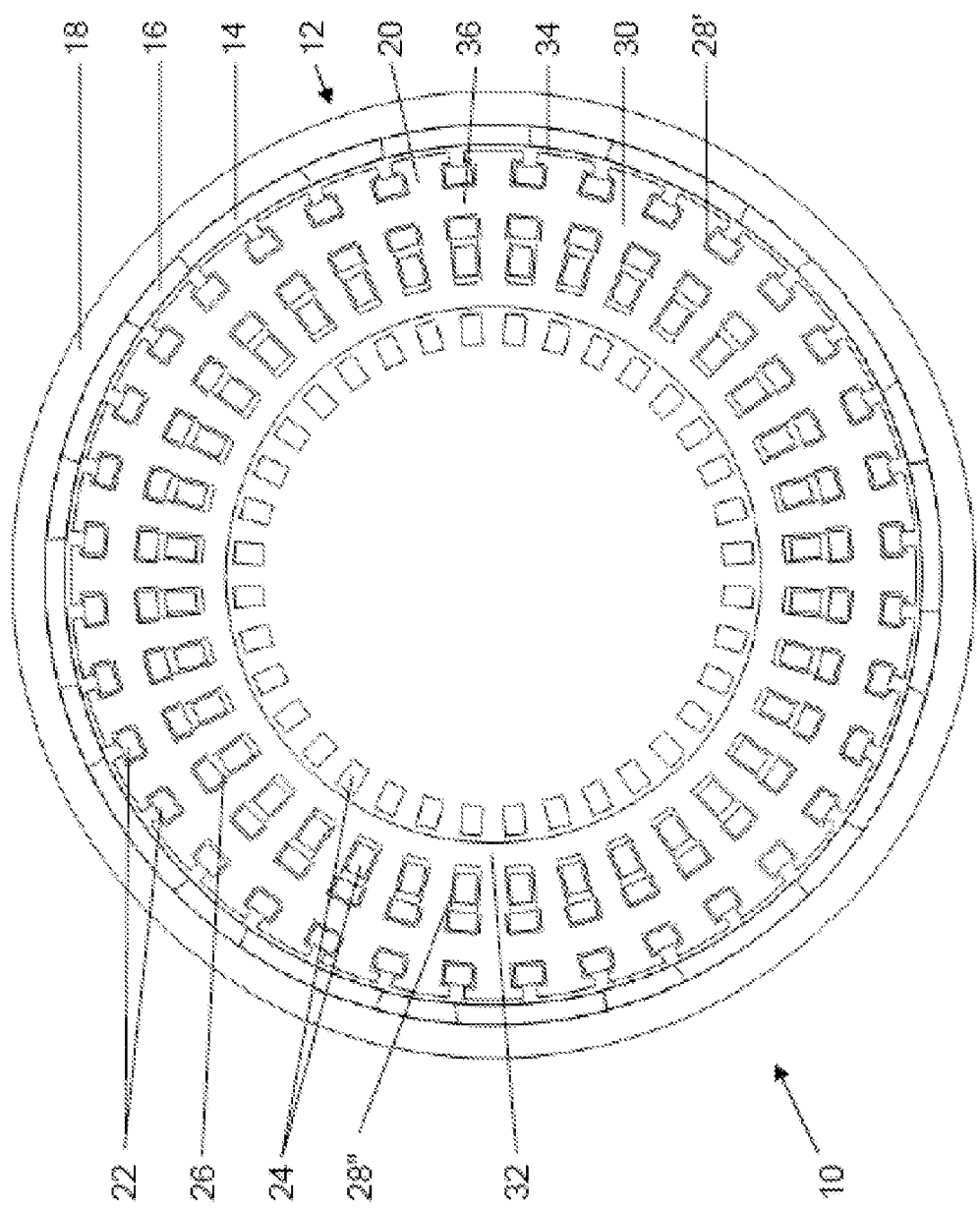
FIG. 1 is
Figure 2:
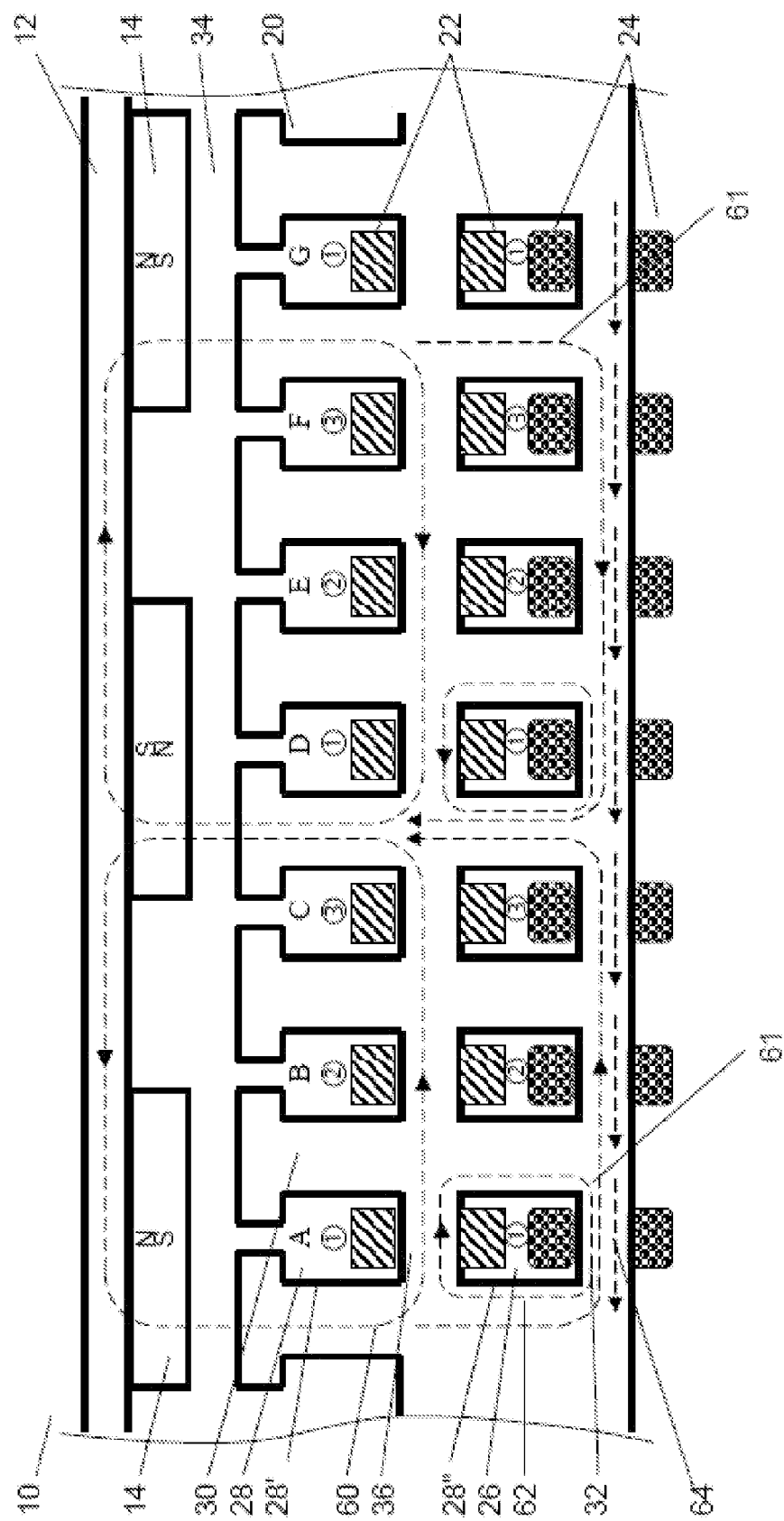
FIG. 2 is a partial schematic of the alternator of FIG. 1.

Referring first to FIGS. 1 and 2, an exemplary electric machine in the form of a permanent magnet (PM) electric machine 10 is depicted. For ease of illustration and description, FIG. 2 shows a linear arrangement of the electric machine 10 of FIG. 1. However, it is to be understood that the machine 10 may have the circular architecture of FIG. 1, with an inside or outside rotor (FIG. 1 shows an outside rotor). It will also be understood by the skilled reader that FIGS. 1 and 2, as well as the accompanying description, are schematic in nature, and that routine details of machine design may have occasionally been omitted for clarity. The machine 10 may be configured as an alternator to generate electrical power, a motor to convert electrical power into mechanical torque, or both.

The machine 10 has a rotor 12 with permanent magnets 14, optionally interposed by spacers 16, which rotor 12 is mounted for rotation relative to a stator 20. A retention sleeve 18 is provided to hold the permanent magnets 14 and the spacers 16. It also provides the magnetic path between the magnets 14. Stator 20 has at least one power winding 22 and preferably at least one control winding 24. In the illustrated embodiment, the stator 20 has a 3-phase design with three essentially independent power windings 22 (the phases are denoted by the circled numerals 1, 2, 3, respectively in FIG. 2) and, correspondingly, three control windings 24. The power windings in this embodiment are star-connected, although they may be delta-connected, or even unconnected, if desired. The power windings 22 and control windings 24 are separated in this embodiment by a winding air gap 26 and are disposed in radial phase slots 28, divided into slot portions 28' and 28", provided in the stator 20 between adjacent teeth 30. For ease of description, the adjacent phase slots 28 are indicated in FIG. 2 as A, B, C, D, etc., to indicate adjacent phase slots 28. The power windings 22 are electrically insulated from the control windings 24. A back iron 32, also referred to as the control flux bus 32 in this application, extends between and at the bottom of the slots 28 (i.e. below the bottoms of adjacent slot portions 28" in FIG. 2). A rotor air gap 34 separates rotor 12 and stator 20 in a typical fashion. A core or "bridge" portion, also referred to as the "power flux bus" 36 portion of stator 20 extends between adjacent pairs of teeth 30 in slot 28 to form the two distinct slots 28' and 28". The first slots 28' hold the power windings 22 only, and the second slots 28" hold both the power windings 22 and control windings 24 adjacent one another.

The materials for the PM machine 10 may be any deemed suitable by the designer. Some exemplary materials are samarium cobalt permanent magnets, copper power and control windings, a suitable saturable electromagnetic material(s) for the stator teeth and power and control flux buses, such as Hiperco 50 alloy (a trademark of Carpenter Technology Corporation) may be used, although other suitable materials, such as electrical silicon steels commonly used in the construction of electromagnetic machines, may also be used. The stator teeth, power and control flux buses may be integral or non-integral with one another, as desired.

Figure 3:
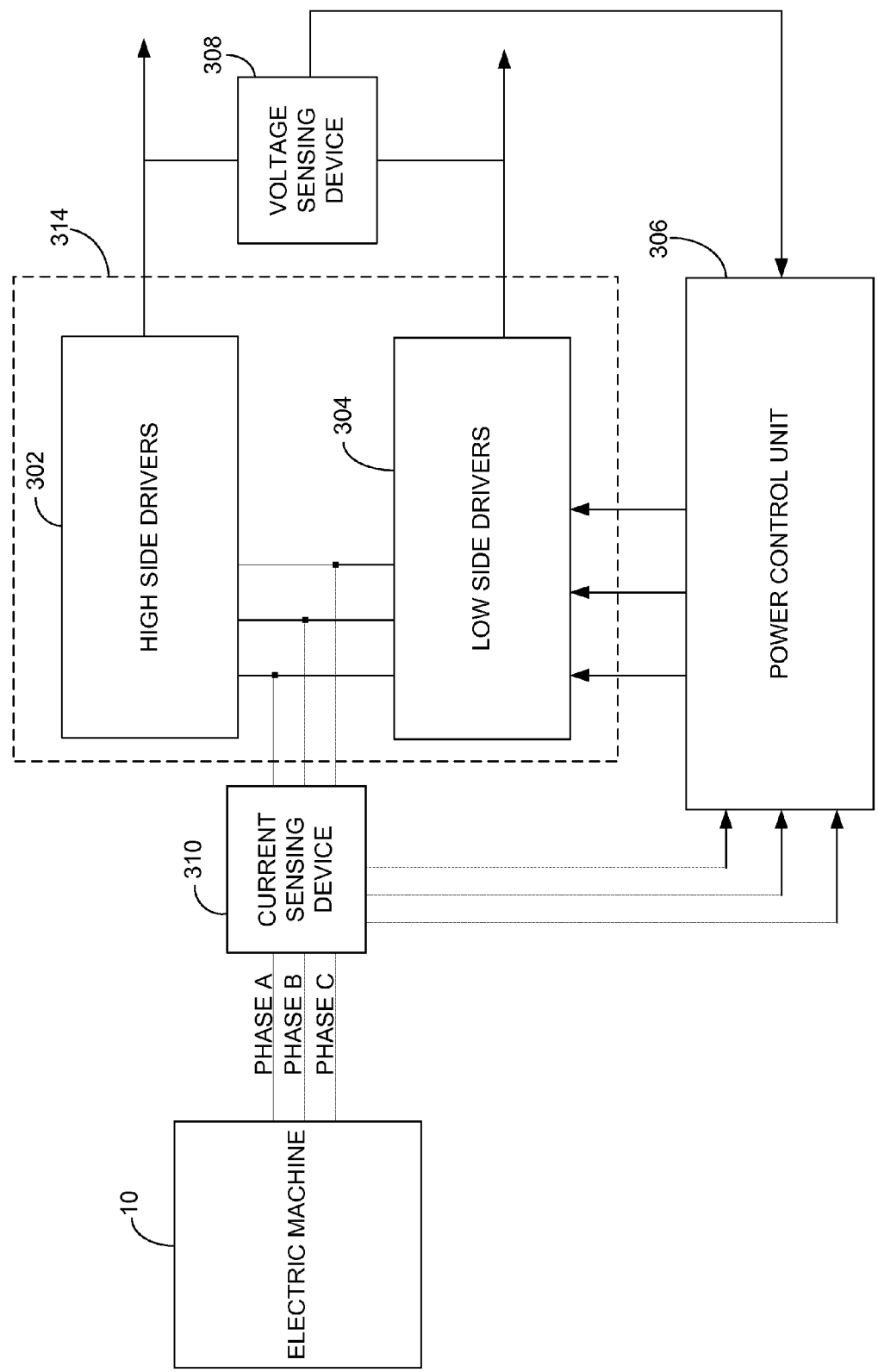
FIG. 3 is a block diagram of an exemplary electrical power generation system with over-voltage protection.

Turning now to FIG. 3, there is illustrated an embodiment for an electrical power generation system with over-voltage protection. The system is described herein as generating a three-phase current but should be understood to generally encompass other multi-phase current-generating embodiments. A power dissipation free shunt regulation scheme protects the electric machine 10 from over-voltage. In order to limit the rectified DC output voltage under low or no load conditions, the input of a three-phase rectifier 314 is momentarily short-circuited by a power control unit 306 when an upper voltage limit is sensed at its output by a voltage sensing device 308. The power control unit 306 will synchronize removal of the short-circuit from the rectifier input with a zero-crossing of AC current in switching devices of the rectifier 314, thus resulting in a transient free switching since the back electromotive force (EMF) due to the electric machine winding inductance will be zero.

The rectifier 314 comprises a set of low side drivers 304 and a set of high side drivers 302 and serves to convert the three-phase alternating current output from the electric machine 10 into direct current electricity. An output of the electric machine 10 is operatively connected to an input of the rectifier 314, via a current sensing device 310. An output of the rectifier 314 is operatively connected to a load (not shown). The voltage sensing device 308 is also connected to the output of the rectifier 314.

The low side drivers 304 and high side drivers 302 together form a three-phase rectifier circuit having six switching devices, three of which are part of the high side drivers 302 and three of which are part of the low side drivers 304. Each high side switching device corresponds to one phase of the three-phase current and is connected between V+ and the output of the electric machine 10. Similarly, each low side switching device corresponds to one phase of the three-phase current and is connected between the output of the electric machine and V—(i.e. ground). In one exemplary embodiment, the rectifier circuit may be composed of six diodes forming a multi-phase diode bridge, as illustrated in FIG. 4a. Diodes 402a, 402b, 402c form the high side drivers 302 while diodes 404a, 404b, 404c form the low side drivers 304.

Figure 4B:
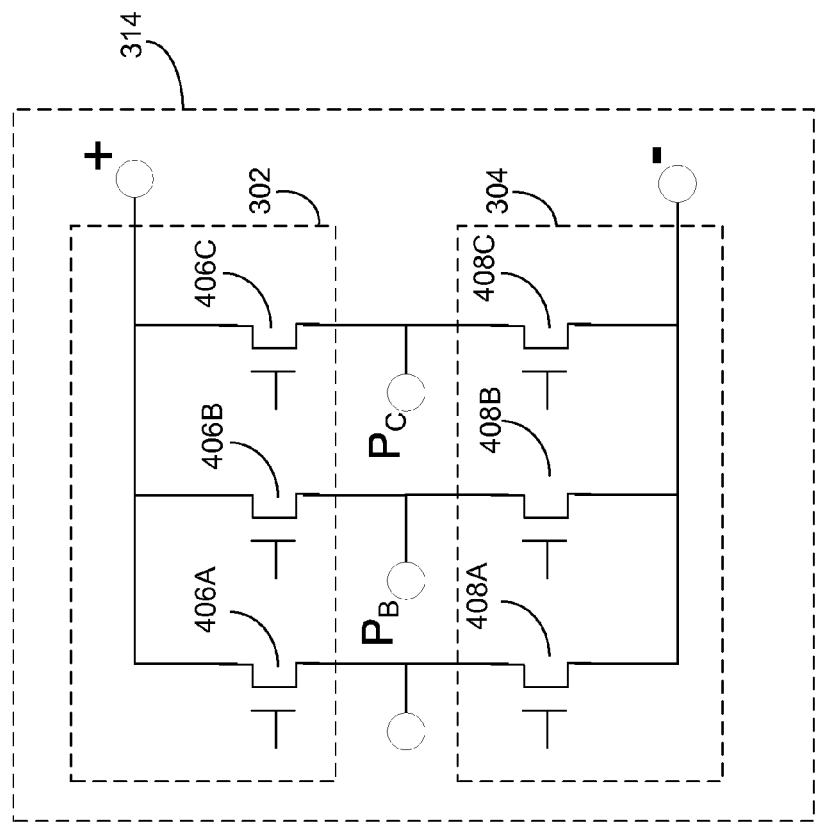
FIGS. 4a and 4b are exemplary embodiments for the rectifier of FIG. 3.
Figure 4A:
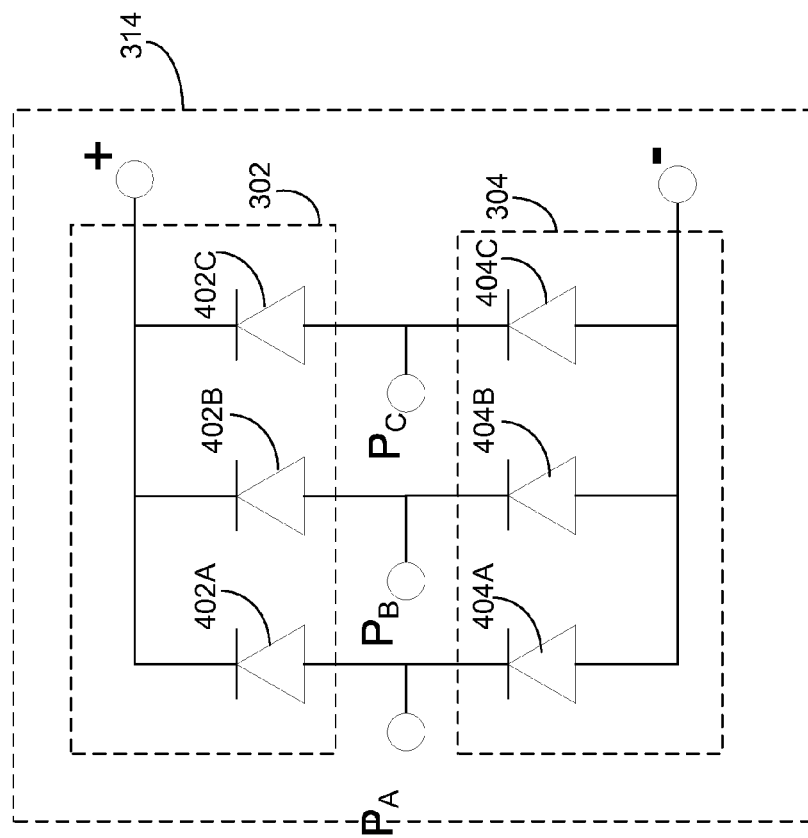

In an alternative embodiment, illustrated in FIG. 4b, the rectifying circuit 314 performs synchronous rectification (or active rectification) and the switching devices correspond to transistors, such as metal-oxide-semiconductor field-effect transistors (MOSFETs) or Insulated Gate bi-polar junction transistors (IGBTs). In this example, transistors 406a, 406b, 406c form the high side drivers while transistors 408a, 408b, 408c form the low side drivers. The intrinsic diode of each transistor behaves similarly to the diodes illustrated in the embodiments of FIG. 4a. Other alternative switching devices, such as thyristors may also be used. The low side driver switching devices (404a, 404b, 404c, and 408a, 408b, 408c) will be referred to hereinafter as switching devices $SD_A$, $SD_B$, and $SD_C$.

Figure 5:
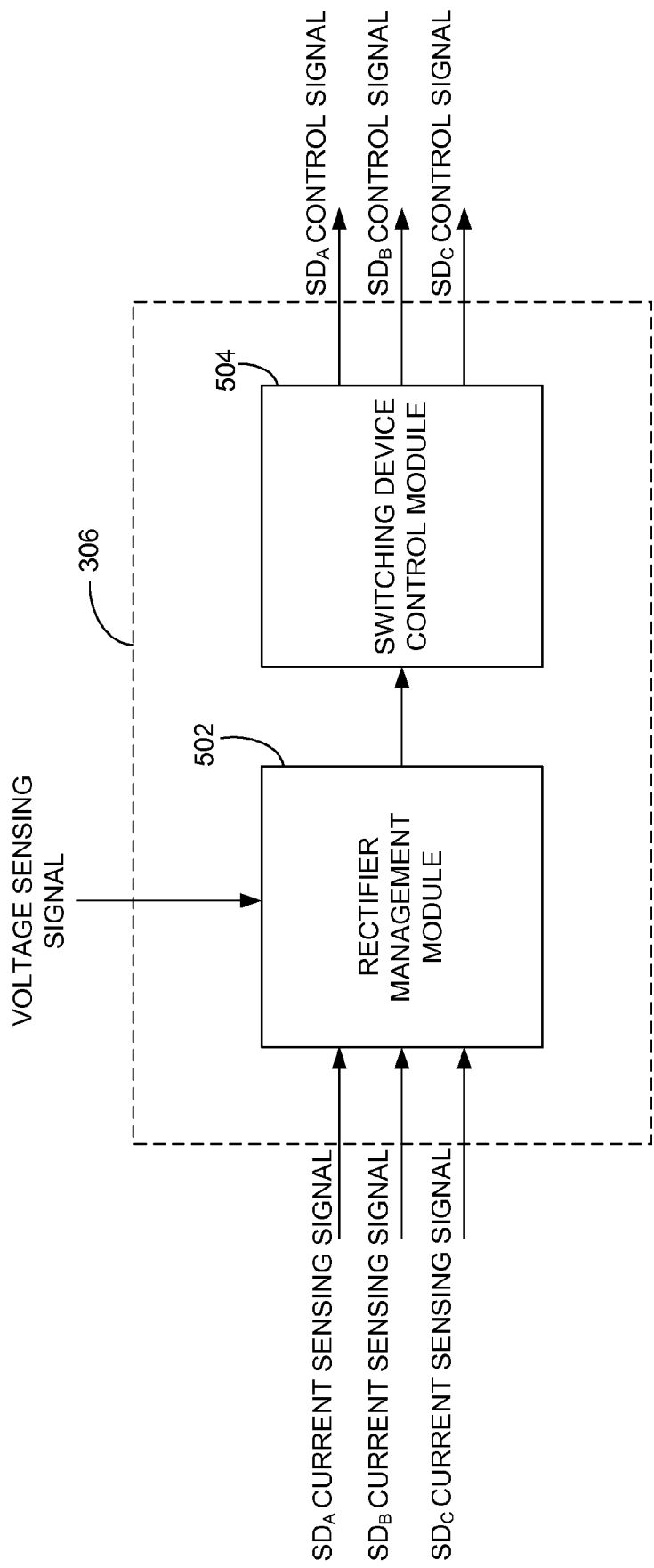
FIG. 5 is a block diagram of an exemplary power control unit from the system of FIG. 3.

FIG. 5 is an exemplary embodiment of the power control unit 306. A rectifier management module 502 receives a voltage sensing signal from the voltage sensing device 308. The voltage sensing device 308 may take various forms, well known to the person skilled in the art. For example, any one or a combination of a xener diode, a voltage comparator and an operational amplifier/voltage reference configuration may be used. The voltage sensing signal is received by a rectifier management module 502 and is indicative of an output voltage of the rectifier 304 that is greater than or equal to a threshold voltage. The threshold voltage may be set as desired to a predetermined value, as a function of the needs of the environment in which the electric machine 10 operates. The voltage sensing signal is used by the rectifier management module 502 to determine the need to short-circuit the rectifier 314.

The rectifier management module 502 also receives current sensing signals from the current sensing device 310. The current sensing device 310 may take various forms, well known to the person skilled in the art. Any current sensor which allows sensing of the phase current under shorted conditions may be used For example, any one of current transformers, Hall effect current sensors, and giant magnetoresistance (GMR) devices may be used. The current sensing signals are indicative of a zero-crossing of alternating current flowing through each one of switching devices $SD_A$, $SD_B$, and $SD_C$ respectively. The current sensing signals are used by the rectifier management module 502 to determine the timing to remove the short-circuit applied to the rectifier 314.

The rectifier management module 502 communicates with a switching device control module 504 to turn the switching devices $SD_A$, $SD_B$, and $SD_C$ on and off. A separate control signal is sent to each one of the switching devices $SD_A$, $SD_B$, and $SD_C$ in order to either short-circuit the rectifier 314 or remove the short-circuit. Turning the switching devices on will short-circuit the input of the rectifier 314 as switching devices $SD_A$, $SD_B$, and $SD_C$ are connected between the output of the electric machine 10 and ground.

Figure 6:
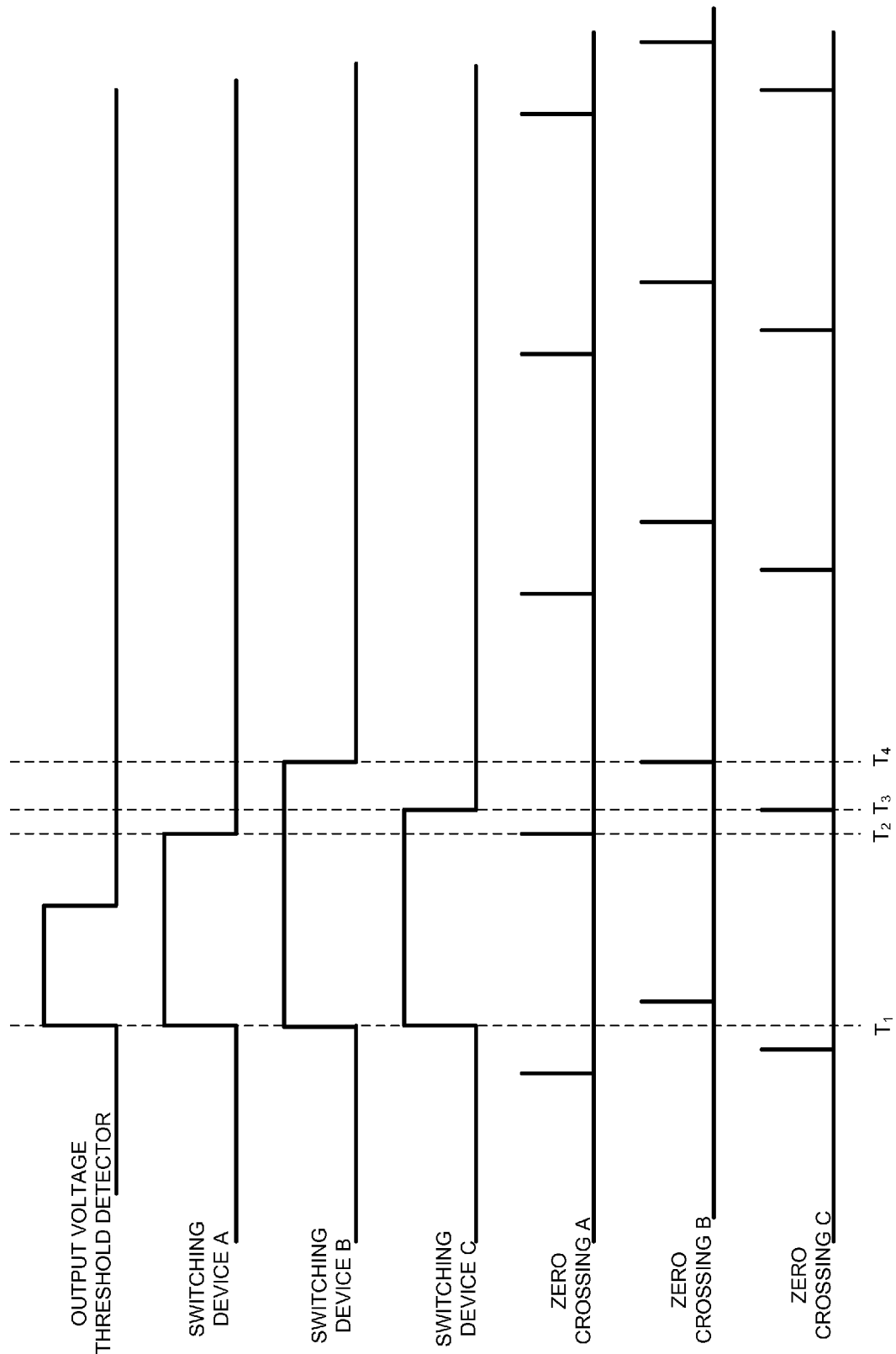
FIG. 6 is an exemplary event diagram illustrating the timing of the switching on and off of switching devices.

Timing of the switching on and off of switching devices $SD_A$, $SD_B$, and $SD_C$ is illustrated with the exemplary event diagram of FIG. 6. The uppermost signal represents the sensed output voltage of the rectifier 314. It transitions to a high state when the output of the rectifier 314 has reached the voltage threshold. This causes all low side drivers, namely switching devices $SD_A$, $SD_B$, and $SD_C$, to be turned on, as shown at time $T=T_1$. The output voltage threshold signal transitions back to the low state when the sensed voltage is no longer above the voltage threshold. Its transition from the high state to the low state has no effect on the switching devices $SD_A$, $SD_B$, and $SD_C$.

Each switching device is held on until a zero crossing of the alternating current is detected, provided the output voltage threshold signal has returned to the low state. Should the output voltage signal still be high at the time of a first zero crossing, the switching devices would remain on. At time $T=T_2$, a zero crossing is detected for $SD_A$ and this device is thus turned off. At time $T=T_3$, a zero crossing is detected for $SD_C$ and this device is thus turned off. At time $T=T_4$, a zero crossing is detected for $SD_B$ and this device is thus turned off. In this example, the zero-crossing for switching devices $SD_A$, $SD_B$, and $SD_C$ is shown to occur at different times. It should be understood that two or three of the switching devices may be switched off concurrently if the zero-crossings are detected simultaneously.

Figure 7:
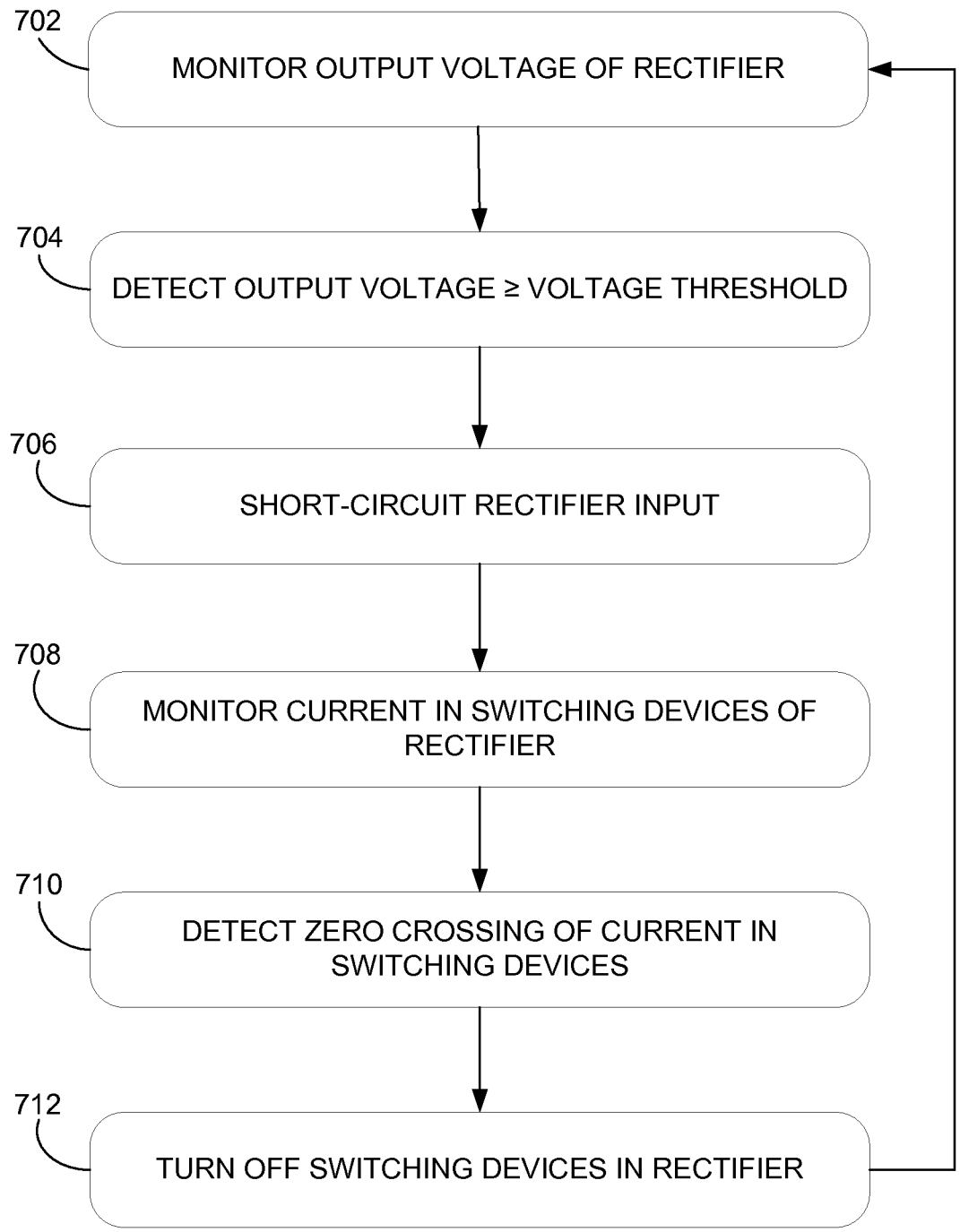
FIG. 7 is a flowchart of an exemplary control method for an electrical power generation system with over-voltage protection.

Referring now to FIG. 7, there is illustrated a method for controlling the over voltage protection system described above. In a first step 702, the output of the three-phase rectifier is monitored. Upon detection of an output voltage greater than or equal to a voltage threshold 704, the input of the rectifier is short-circuited 706 by turning on all three switching devices connected between the input of the rectifier and ground. The alternating current in each switching device is monitored 708 until a zero-crossing is detected 710. If the output voltage of the rectifier is no longer above the voltage threshold when the zero-crossing is detected, then the switching device corresponding to the zero-crossing is turned off 712. After all three switching devices have been turned off, the cycle may begin again with the monitoring of the output voltage of the rectifier 702. This results in the output voltage of the system being upper limited to the desired voltage under all conditions.

While illustrated in the block diagrams as groups of discrete components communicating with each other via distinct data signal connections, it will be understood by those skilled in the art that the present embodiments may be provided by a combination of hardware and software components, with some components being implemented by a given function or operation of a hardware or software system, and some of the data paths illustrated being implemented by data communication within a computer application or operating system. For example, the power control unit 306 may be implemented using hardwired logic, Field-Programmable Gate Arrays (FPGAs), analog systems, etc. The structure illustrated is thus provided for efficiency of teaching of the present embodiment. In addition, many of the existing components present in a typical control system for an electric machine may be used for the present over-voltage protection system. For example, the low side drivers 304 are typically used during a start or driving operation of an electric machine. The voltage sensing device 308 and the current sensing device 310 may similarly already be present for other control purposes and may simply be adapted to operate within the present over-voltage protection system.

It should be noted that the present invention can be carried out as a method, can be embodied in a system or on a computer readable medium. The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. An electrical power generation system with over-voltage protection comprising:
a multi-phase alternating current generating electric machine having output terminals;
a multi-phase rectifier operatively connected between the output terminals of the electric machine and a load, the rectifier comprising a set of low side switching devices connected between the output terminal and a ground and a set of high side switching devices connected between the output terminals and a positive voltage source;
a voltage sensing device operatively connected to an output of the rectifier for sensing an output voltage of the rectifier;
at least one current sensing device operatively connected to the phases of the multi-phase alternating current generating electric machine; and
a power control unit for generating a signal that switches the low side switching devices to an on state when the output voltage of the rectifier reaches a threshold voltage, and for generating independent signals that switch a corresponding one of the low side switching devices back to an off state when the alternating current flowing therethrough is substantially zero and the output voltage of the rectifier is no longer above the threshold voltage.

2. The electrical power generation system of claim 1, wherein the multi-phase alternating current generating electric machine is a regulated permanent magnet generator.

3. The electrical power generation system of claim 1, wherein the low side switching devices and the high side switching devices form a multi-phase diode bridge.

4. The electrical power generation system of claim 1, wherein the low side switching devices and the high side switching devices form a multi-phase transistor bridge.

5. The electrical power generation system of claim 1, wherein the power control unit comprises a rectifier management module that receives a voltage sensing signal from the voltage sensing device and current sensing signals from the at least one current sensing device, and determines a timing to transition the low side switching devices between the on state and the off state.

6. The electrical power generation system of claim 5, wherein the power control unit comprises a switching device control module for receiving a switching control signal from the rectifier management module and generating a switching device control signal in accordance with the switching control signal.

7. The electrical power generation system of claim 1, wherein the power control unit is a field programmable gate array.

8. A method for protecting an electrical power generation system from an over-voltage comprising:
monitoring an output voltage of a multi-phase rectifier operatively connected between output terminals of an electric machine and a load;
short-circuiting an input of the multi-phase rectifier upon detection that the output voltage has reached a threshold voltage; and
synchronizing removal of the short-circuiting of the input of the multi-phase rectifier with a substantially zero-crossing of phase current flowing through switching devices in the rectifier once the output voltage is no longer above the threshold voltage.

9. The method of claim 8, wherein short-circuiting the input of the multi-phase rectifier comprises transitioning the switching devices connected between the output terminals of the electric machine and a ground from an off state to an on state.

10. The method of claim 9, wherein removal of the short-circuiting comprises transitioning the switching devices from the on state to the off state.

11. The method of claim 10, wherein transitioning the switching devices from the on state to the off state comprises transitioning each one of the switching devices independently as a function of the phase current flowing therethrough.

12. The method of claim 8, further comprising monitoring the phase current flowing through the switching devices in the rectifier.

13. The method of claim 8, further comprising detecting the substantially zero-crossing of phase current flowing through each one of the switching devices.

14. The method of claim 8, wherein short-circuiting the input of the rectifier comprises activating part of a multi-phase diode bridge.

15. The method of claim 8, wherein short-circuiting the input of the rectifier comprises activating part of a multi-phase transistor bridge.

16. An apparatus for protecting an electrical power generation system from an over-voltage comprising:
  means for monitoring an output voltage of a multi-phase rectifier operatively connected between output terminals of an electric machine and a load;
  means for short-circuiting an input of the multi-phase rectifier upon detection that the output voltage has reached a threshold voltage; and
  means for synchronizing removal of the short-circuiting of the input of the multi-phase rectifier with a substantially zero-crossing of phase current flowing through switching devices in the rectifier once the output voltage is no longer above the threshold voltage.

* * * * *